July 14, 1931.  A. C. FISCHER  1,814,139
CONSTRUCTIONAL MATERIAL
Filed Dec. 22, 1927
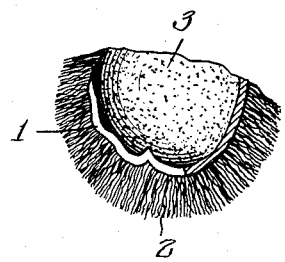
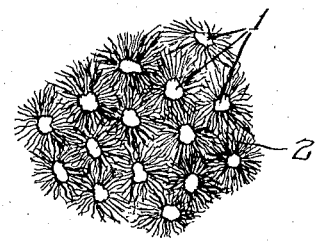
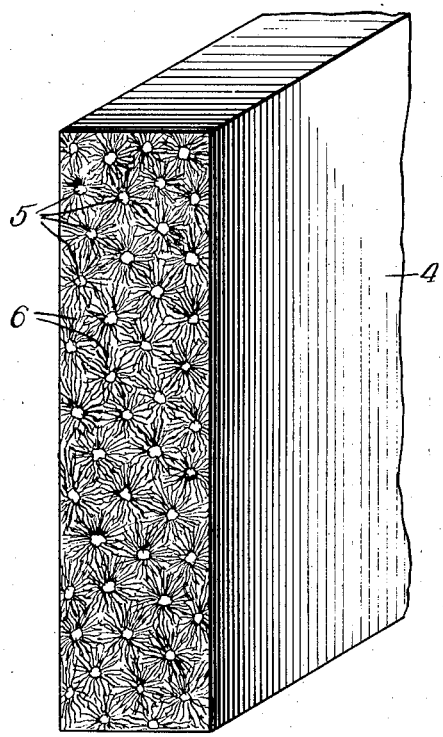
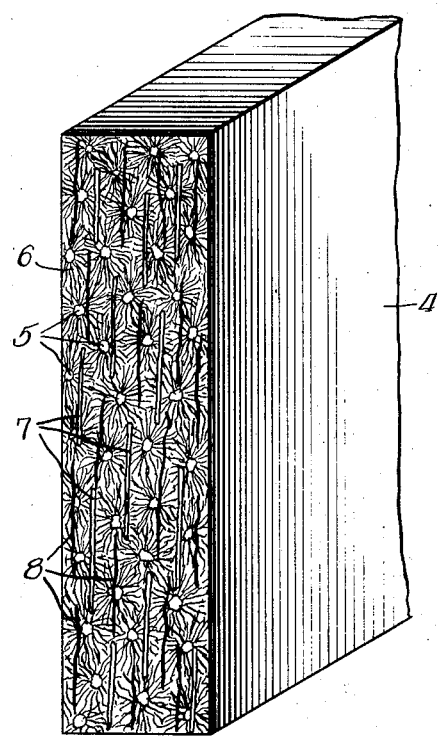

Patented July 14, 1931

1,814,139

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

CONSTRUCTIONAL MATERIAL

Application filed December 22, 1927. Serial No. 241,972.

This case is a continuation in part of my application Serial No. 151,417, filed November 29, 1926 and which matured in Patent No. 1,770,358 on July 8, 1930.

The salient feature of the present invention resides in the selection of cotton-seed hulls, either alone or in combination with other filling material, as a reinforcing filling medium for preformed bituminous paving joints.

Cotton-seed hulls are not like other hulls. They have anchored to them various sized lengths of shortened cotton fibers, and when mixed with bituminous material the hull portion anchors in the bituminous material, and the fibers gather either around the hull portion or interlace with other tentacles emanating from the hull.

By mixing cotton-seed hulls as described, a loosely felted mat consisting of cotton fiber tentacles interlaced about hull fragments is formed, and upon extraction of the bituminous material the loosely matted structure with the uniformly interspersed hulls can readily be seen. The structure is unique and entirely new, is economical because the cotton-seed hulls are either fed to cattle with the meal or are a waste product on the market.

When cotton-seed hulls are mixed with bituminous material in a homogeneous mass, which is accomplished by mixing in steam-heated mixers and using liquid bituminous material and forcing therein thru the mixing operation the proper percentage of cotton-seed hulls, a homogeneous structure is secured as described. I find upon a water absorption test over a period of twenty-four hours that the water absorption of this product is about seventeen per cent. I therefore treat the cotton-seed hulls with water under heat or steam for several hours, and I find that where the hulls are so treated the water absorption is reduced to about five per cent. The hulls can also be treated with water having about one or two per cent caustic soda added thereto, and so treated, after being immersed therein for a number of hours, either cold or warm, depending upon the desire, I find the cotton-seed hulls after being dried when mixed with the bituminous material show considerably less than five per cent water absorption.

My constructional material may be produced by (1) mixing cotton-seed hulls in a natural state with a waterproofed binder, and after suitable mixing reducing same to sheet form, (2) my material can be produced by treating cotton-seed hulls of the type described with steam or heated water for a definite period, which may be two, three or four hours, then drying same and incorporating same in a waterproofed binder, by which process a material will be produced having less water absorption. My third process relates to the preparation of this material by treating the cotton-seed hulls with water in a heated state and having one or two per cent caustic soda added thereto, and by two or three hours' treatment, subsequent washing and drying and then incorporating same with a waterproofed binder I find that a constructional material can be obtained having less than five per cent water absorption, and with a continued treatment I can produce a material having a water absorption of less than three per cent. A structure such as is shown in the drawing is obtained which is entirely new and original, and in the successive stages of the processes described I find that the tensile strength of the material is greatly increased as the water absorption is lessened. I can further increase the tensile strength by introducing longer and stouter fiber. This material may be extruded or rolled by pressure means, or molded. The better water absorption results from a longer time required in the process and longer mixing periods, and reflects the material in various stages in which it can be used for inside or outside purposes, or anywhere where it would be suitable for constructional uses, primarily as an expansion joint for the manufacture of rail filler, sheet material, bricks, blocks and the like. The action of water swells the hull particles and removes the vegetable gum from the fiber and the hull, making it more readily penetrated by the waterproof binder.

In the drawings Figure 1 is a detailed perspective view of a fragment of a cotton-seed hull exaggerated for the purpose of showing as much as possible its characteristic structure which makes it especially adaptable as a reinforcing filling material.

Figure 2 is a view in perspective of a matted mass of these fragments shown in Figure 1.

Figure 3 is a perspective view of a portion of a preformed strip of paving joint showing the fragments of cotton-seed hulls felted into a mat and permeated with bituminous material; and Figure 4 is a view similar to Figure 3, but showing the addition of separately acting web-like reinforcing pieces and long fibers incorporated in combination with the felted fragments of cotton-seed hulls.

These fragments of cotton-seed hulls are obtainable on the market as a more or less waste product, and, as clearly shown in Figure 1 the fragment of the shell 1 is covered with more or less thickly clustered cotton linters 2, which are the unsalvaged fibers of the cotton. The shell fragments for the most part are concave and will be found in irregular shapes, some of which having jagged edges and points, which develops a roughened uneven margin, and the inside surfaces of the fragments shown as at 3 are pitted and roughened.

The nap-like clustered linters covering the convex outer surface of these fragments give to the fragment the quality of adhering to another fragment, so that by bringing a quantity of these fragments together the nap-like covering of linters will intertwine or interlock so that the fragments cling together and yet are separated for the most part by a loosely matted nap of linters. This is clearly shown in Figure 2.

A quantity of these fragments matted together in this way leaves an unusually compressible matted mass. Consequently by mixing a quantity of these fragments with bituminous material so as to develop a felted, mat-like strip permeated with bituminous material, by resorting to the process heretofore described I am able to develop a highly compressible paving joint which has unusual re-expanding qualities, and a strip thus formed will compensate for expansion of the concrete sections between which it is installed with the greatest efficiency. As an example, upon expansion of the concrete sections, which will impart pressure to the sides of the strip, the joint will readily respond to such pressure, and thus yielding compressibility will permit the sections of the concrete to expand.

A practical paving joint is not only expected to compensate for expansion of the concrete, but it must also be so constructed that it will compensate for contraction. For instance, when the sections contract the concrete theoretically moves away from the joint, thus enlarging the space occupied by the joint. Now, unless the material of the joint is capable of expanding and completely filling this enlarged space a crevice will be left between the sides of the joint and the concrete sections which will eventually be filled up with débris, water, street acids and other deteriorating matter which would destroy the functioning of the joint. A joint constructed in accordance with the present invention, will, owing to the highly compressible and re-expanding qualities of the materials used, keep this space completely filled upon contraction of the sections.

Aside from the advantages above explained these fragments of cotton-seed hulls have other ingredients which improve the qualities of the paving joint, and these advantages are best brought out by a comparative explanation.

Comparing these fragments to other hull-like materials, viz., rice hulls or the equivalent, it is a fact that the smooth, shiny surface of rice hulls, or any other grain hulls, offer little if any resistance to slipping in the bituminous material, especially at temperatures which are apt to soften the bituminous material, whereas the jagged edges of the cotton hull fragments, the inside pitted roughened surface as at 3, Figure 1, and the concave continuity of the fragments offer jagged and roughened projections to which the asphalt will adhere and cling much better than the smooth and comparatively glossy surface of other hull-like materials.

This result is also emphasized by the interlocking of the nap-like linters covering the outer surface of the fragments, particularly when it is considered that a part of these fragments are embodied in the strip as a felted mat with the bituminous material permeating the same.

The parallel stratification of these cotton-seed hulls is not as pronounced as in the case of the use of pieces of filling material that are longer than their width or thickness, but the same principle is involved, particularly with respect to those fragments of cotton-seed hulls which happen to be crushed in pieces large enough to respond to the flow set up in the warm, flowable mass by the sheet forming apparatus, and in a quantity of these fragments of cotton-seed hulls there will be many fragments large enough to respond to this result.

In Figure 3, 4 represents the paving joint, 5 the hull fragments and 6 the interlocked or intertwined nap of cotton fibers, the latter developing the matted felt like mass of fibrous material with the hull fragments separated one from another by a mixture of these cotton fibers and permeated bituminous material. In many respects these hull fragments when thus used are in themselves separately acting web-like reinforcing pieces. However, to increase the content of this particular kind of a filler I may use roofing scrap of the same kind as explained in my Patent No. 1,572,474, issued February 9, 1926.

Figure 4 shows the same type of joint illustrated in Figure 3, but with the addition of the piece of roofing scrap as at 7, and long fibers 8.

In addition to these fragments of cotton-seed hulls I may also desire to use long fibrous material, such as, cocoanut fiber, sisal, hemp, jute, or any other suitable equivalent long fiber, and I might use such long fibers not only in combination with the fragments of cotton-seed hulls but also in a mixture in which the roofing scrap or other separately acting web-like reinforcing pieces are used.

In any of the mixtures that I would develop from the materials referred to I would always use a preponderance of bituminous material, and I wish to emphasize this point, as it is invaluable in producing a practical type of joint.

In some rare instances there is a possibility that fifty per cent bituminous material and fifty per cent by weight of these fragments of cotton-seed hulls will be acceptable, but never would I use more than a fifty fifty mixture, and more frequently, in order to meet the specifications for the standard preformed paving joint material, I would recommend approximately seventy-five per cent bituminous material and twenty-five per cent by weight of fragments of cotton-seed hulls. It will not be necessary for me to go into detail as to why a preponderance of bituminous material is used, since those skilled in the art recognize this requirement as an unfailing necessity, and to the best of my knowledge there has never been an acceptable paving joint which has not contained a preponderance of bituminous material.

It is, of course, understood that when I say seventy-five per cent bituminous material and twenty-five per cent fragments of cotton-seed hulls I use the term "approximate" to leave me a reasonable leeway, one way or the other, for it may well be that I could cut the bituminous material percentage to as low as sixty per cent, and may even find some instances where a fifty fifty mixture will serve. This would be the exception rather than the rule.

I can very well use this formula for a mixture in which the cotton-seed hulls are used in combination with roofing scrap, cocoanut fiber, sisal, jute, or other long fibers. In other words, in using a combination of these ingredients I always use a preponderance of bituminous material, and an acceptable combination of such a mixture would be seventy-five per cent bituminous material and twenty-five per cent filling material. As a more detailed explanation I may recommend seventy-five per cent bituminous material, twenty per cent fragments of cotton-seed hulls and five per cent long fiber, such as, cocoanut fiber, sisal etc., or seventy-five per cent bituminous material, fifteen per cent fragments of cotton-seed hulls and ten per cent roofing scrap. These proportions are all measured by weight and not by bulk.

I have heretofore discovered that a rubber content in proportion sufficient to add elasticity to the preformed strip is an acceptable addition to any expansion joint material, and the same would apply equally well to the combination explained in the present application. In the event that the rubber content was added it would be in the form of either uncoagulated latex, reclaimed rubber, rubber latex, or any form of liquid rubber, and it would be added preferably during the mixing process. There is one consideration in the addition of a rubber content, I would not have to use, in this event, a preponderance of bituminous material as the rubber content would supply the difference in a lower ratio of bituminous material, say for instance fifty per cent bituminous material, twenty per cent fragments of cotton-seed hulls by weight, ten per cent roofing scrap by weight and a twenty per cent rubber content.

There is another qualifying statement that should be explained to interpret the scope of the present invention as recited in the subjoined claims. I have been referring to bituminous material. The bituminous material is in reality a binder, and for the most part I would prefer to use blown asphalt or oxidized asphalt as a binder. However, due to the fact that a rubber content, such as above explained, used in combination with road oil or a macadam binder will take the place of blown asphalt and oxidized asphalt I will use the term "waterproofing binder" as embracing bituminous material or its equivalent. In reciting the invention in the accompanying claims the terms "road oil" and "macadam binder" are intended to embrace those materials, or the equivalent to the same as identified by Herbert Abraham in the book entitled "Asphalts and Allied Substances" the 1918 edition.

While the relatively long fibers, such as, cocoanut fiber, hemp, sisal, and the like, are used for the reinforcing properties that they will lend to the strip, they also lace the disintegrated cotton-seed hulls together by intertwining with the nap-like cotton fibers on the outside of the hull fragments, so that the felted mat thus formed is practically sewed together so to speak.

I claim:

1. Constructional material comprising a preformed body consisting of a homogeneous mixture of a waterproofed binder, rubber material and cotton-seed hulls.

2. Preformed constructional material comprising a homogeneous mixture of waterproofed binder, rubber material and hulls having anchored to them cotton fiber.

3. Preformed constructional material comprising a homogeneous mixture of a waterproofed binder, rubber material and hulls having cotton fiber emanating therefrom, forming a mat-like structure in the homogeneous mass and the fiber surrounding the hull sections.

4. A preformed constructional material comprising a homogeneous mixture of waterproofed binder, rubber material and cotton fiber and hulls, said hulls being distributed heterogeneously thruout the mass.

5. The method of preparing a preformed constructional material comprising the mixing of cotton seed hulls having cotton fiber emanating therefrom, in a waterproof binder, incorporating rubber material and reducing the resulting mass to sheet form.

6. The method of preparing a constructional material which comprises the steps of preparing a liquid, heated, waterproof binder including a rubber content, mixing therein cotton-seed hulls having cotton fibers emanating from the hulls, and pressing same to the desired form.

7. The method of forming a fibrous, mat-like structure in a preformed, bituminous constructional material, which consists in incorporating cotton-seed hulls and cotton fibers in a liquid waterproof binder including a rubber content thru a mixing operation, cooling the resulting mass and reducing same to proper form.

8. The process of preparing a preformed constructional material which consists in treating cotton-seed hulls, having cotton fiber emanating therefrom, with hot water, subsequently drying said fibrous material and incorporating same into a liquid waterproofed binder of bituminous and rubber material, suitably mixing the same and subsequently cooling and reducing to proper form.

9. The process which consists in treating cotton seed hulls, having cotton fibers emanating therefrom, with a solution of heated water and two per cent caustic soda, suitably cleansing the fiber so treated, drying same, mixing with a waterproofed, liquid binder including rubber material, cooling same after being mixed, and reducing same to proper form.

10. Preformed constructional material comprising a rubberized bituminous structure having cotton linters distributed therethrough, the cotton-seed hulls interspersed within the linters.

11. Preformed constructional material comprising a rubberized bituminous mass having distributed therethru cotton fiber and granular fibrous material.

12. Constructional material comprising a preformed body consisting of a homogeneous mixture of a rubberized waterproofing binder and seeds, said seeds having a shell covered with emanating linters.

13. Constructional material comprising a preformed body consisting of a homogeneous mixture of a rubberized waterproofed binder, seeds having a shell covered with emanating linters and linear fibers intermingled with the seeds.

14. The method of preparing a preformed constructional material comprising the mixing of seed hulls, having linters emanating therefrom, in a rubberized waterproofing binder, incorporating linear fibers in the mixture, and reducing the mass in sheet form.

15. An expansion joint comprising a preformed strip embodying in its structure a felted mass of disintegrated cotton seed hulls, the outer surface of the disintegrated hulls containing a nap-like covering of unsalvaged cotton fibers, and said mass being permeated with a rubberized waterproof binder.

16. An expansion joint comprising a preformed strip embodying in its structure a felted mat of disintegrated cotton seed hulls, the outer surface of the disintegrated hulls containing a nap-like covering of unsalvaged cotton fibres, said mat being reenforced by a lacing of relatively long fibres and permeated with a rubberized waterproof binder.

Signed at Chicago, Illinois, this 10th day of December 1927.

ALBERT C. FISCHER.